March 10, 1925.  P. E. GILLESPIE  1,529,586
AIRPLANE
Original Filed Jan. 20, 1923   2 Sheets-Sheet 1
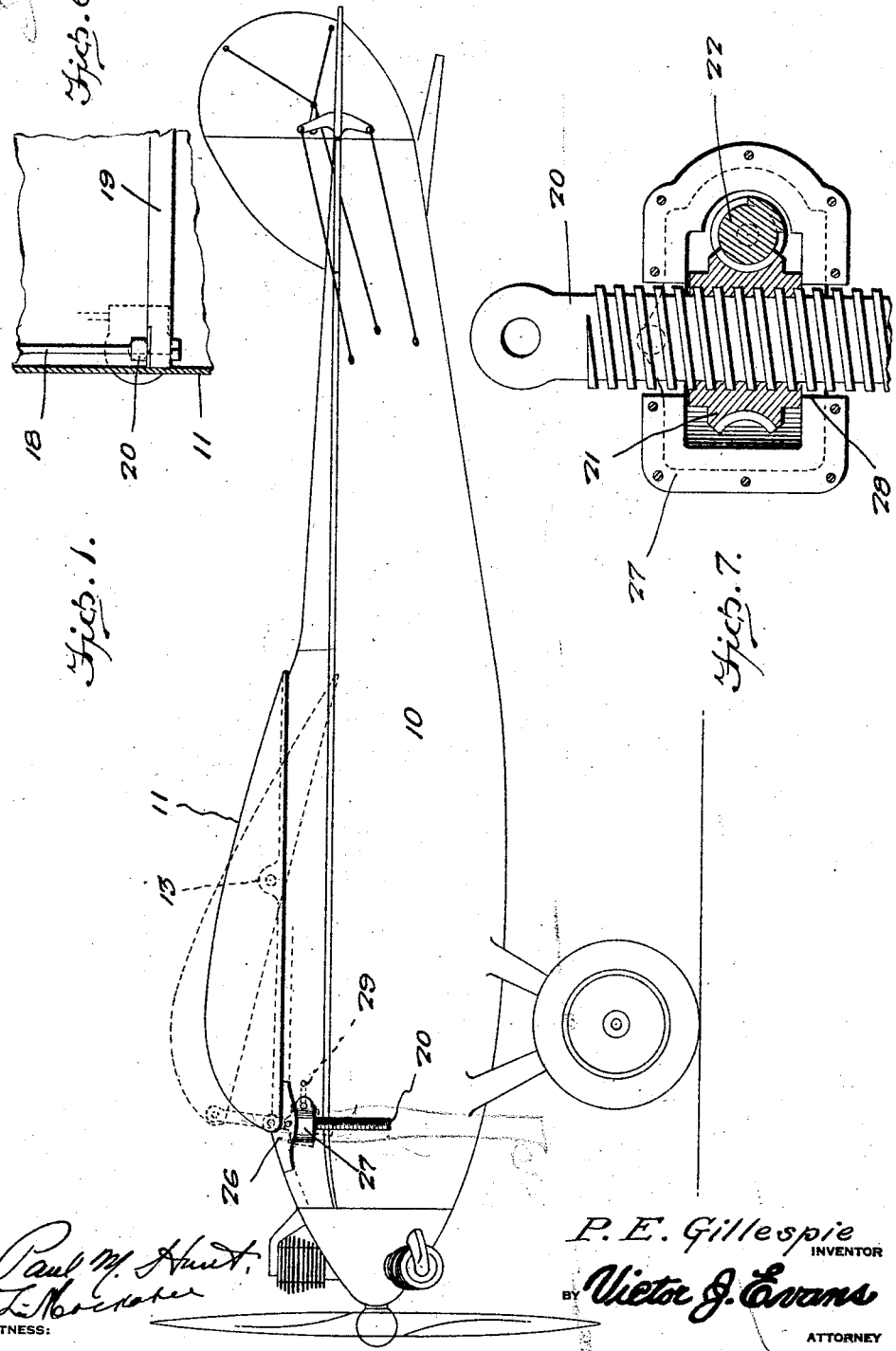

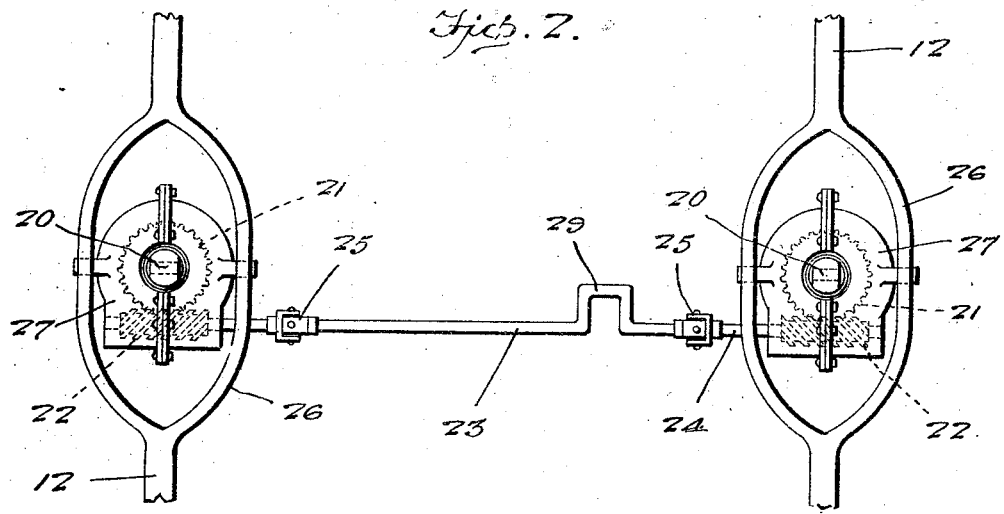
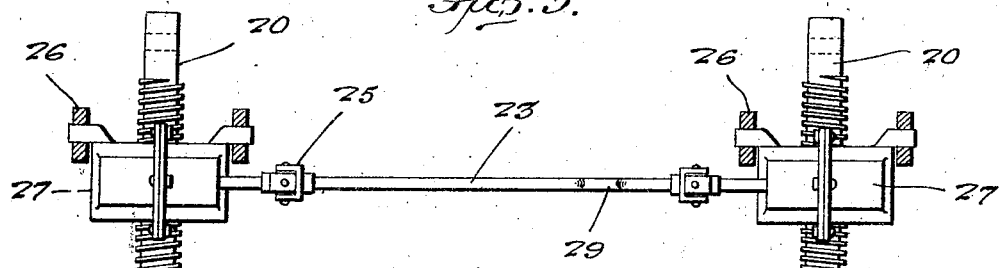
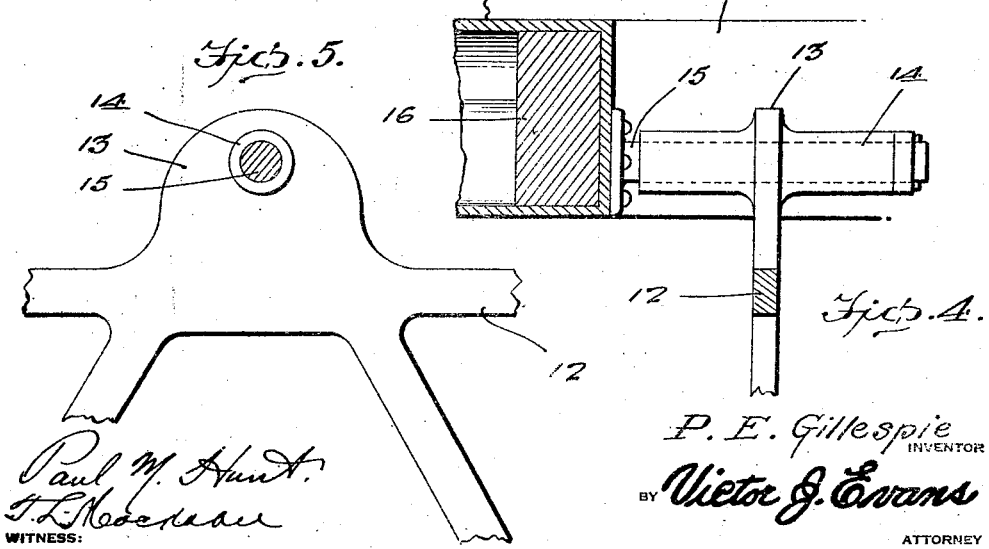

Patented Mar. 10, 1925.

1,529,586

UNITED STATES PATENT OFFICE.

PAUL E. GILLESPIE, OF PORT DEPOSIT, MARYLAND.

AIRPLANE.

Application filed January 20, 1923. Serial No. 614,007. Renewed January 19, 1925.

*To all whom it may concern:*

Be it known that I, PAUL E. GILLESPIE, a citizen of the United States, residing at Port Deposit, in the county of Cecil and State of Maryland, have invented new and useful Improvements in Airplanes, of which the following is a specification.

This invention relates to airplanes especially of the monoplane type and has for an object the provision of means whereby the angle of incidence of the wing may be regulated, so as to provide a perfect balance when the machine is in flight and to change the said angle when landing: to provide increased wind resistance or brake and thus materially decrease the amount of space and distance required to effect a safe landing, the invention being especially adapted for use in connection with high speed and fast landing planes.

With the above and other objects in view, the invention further includes the following novel features and details of construction, to be hereinafter more fully described, illustrated in the accompanying drawings and pointed out in the appended claims.

In the drawings:—

Figure 1 is a side elevation of a monoplane constructed in accordance with the invention.

Figure 2 is a fragmentary plan view showing portions of the side bars of the fuselage frame with the invention applied.

Figure 3 is a view showing the side bars of the fuselage frame in section and the invention in elevation.

Figure 4 is a fragmentary view illustrating the pivotal mounting of the wing.

Figure 5 is a fragmentary elevation of a portion of a frame structure.

Figure 6 is a sectional view of a portion of the wing structure showing the means of connecting the wing adjusting mechanism therewith.

Figure 7 is an enlarged vertical sectional view illustrating the connection between the operating shaft and one of the jacks.

Referring to the drawings in detail, wherein like characters of reference denote corresponding parts, the reference character 10 indicates the body or fuselage of a monoplane, the wing of which is indicated at 11.

The fuselage may be of any preferred construction which includes longitudinally disposed side bars 12, forming a portion of the frame of the fuselage. These side bars in the present invention have extending therefrom plates or projections 13 which provide bearings 14 for stub shafts 15. These stub shafts are connected to ribs 16 which form a part of the structure of the wing 11, the said wing being recessed as at 17 immediately over the cock pit of the machine. The wing 11 may thus be tilted in the manner indicated by the dotted lines in Figure 1, this tilting action altering or changing the angle of incidence so that the machine may be properly and accurately balanced during flight, or may be adjusted as indicated by the dotted lines in Figure 1 to retard its forward movement. The invention is especially designed for this last mentioned purpose so as to facilitate landing, that is, permit a fast plane to safely land in a relatively small space.

For the purpose of adjusting the angle of the wing 11, there is provided a pivot bar 18 which has its opposite ends secured to spaced ribs 19, which form a part of the wing structure, the pivot bar 18 being located adjacent the leading edge of the wing. Pivotally mounted upon the bar 18 at opposite sides of the fuselage 10 is a jack screw 20 which has a threaded engagement with an internally threaded worm 21. This worm gear forms a nut which, when rotated will move the jack screw 20 longitudinally to raise and lower the forward or leading edge of the wing 11. The gears 21 are engaged by worms 22 which are mounted upon the outer ends of an operating shaft 23 extending transversely of the cock pit and within convenient reach of the aviator.

The shaft 23 is of sectional formation and includes end sections 24 which are connected to the intermediate section by universal joints 25 so as to provide for strains and twists of the fuselage, especially when the machine is travelling over the surface of the ground.

In the present form of the invention, the side bars 12 of the fuselage frame are bifurcated as shown in Figures 2 and 3 of the drawings so as to provide spaced bearing members 26, within which are pivotally mounted housings 27 which enclose the worm 22 and the worm gears 21. In addition, the housings provide bearings for the outer sections or ends of the shafts 23 which are pivotally movable to permit of the angular position of the jacks 20 when the wing is tilted to the position shown by the dotted lines in Figure 1. The housings 27 are preferably of sectional formation and are bolted together as shown and in addition are provided with oppositely located openings 28 for the passage of the jack screws.

It will be apparent from the foregoing description and accompanying drawings, that rotation of the shaft 23 will move the jack screws 20 through the gearing 21 and 22 and consequently pivotally adjust the wing 11, permitting the leading end of the said wing to be elevated so as to provide wing resistance to retard the forward movement of the airplane.

Any convenient means may be provided for rotating the shaft 23, such as a crank arm 29 formed in the central portion of the shaft and providing a hand grip whereby the shaft may be manually rotated.

The invention is susceptible of various changes in its form, proportions and minor details of construction and the right is herein reserved to make such changes as properly fall within the scope of the appended claims.

Having described the invention what is claimed is:—

1. In an airplane, a pivotally mounted wing, vertically disposed jack screws having one of their ends pivotally secured to the wing, nuts engaging the jack screws, means including a shaft extending transversely of the airplane and operatively engaged with the nuts, whereby the latter may be simultaneously rotated to operate the jack screws and adjust the angle of incidence of the wing, combined housings and shaft bearings surrounding the jack screws and enclosing the nuts and means for securing the combined housings and shaft bearings to the airplane to permit of relative movement.

2. In an airplane, a pivotally mounted wing, vertically disposed jack screws having one of their ends pivotally secured to the wing, nuts engaging the jack screws, an operating shaft extending transversely of the airplane, gearing operatively connecting the shaft and jack screws, whereby the latter may be operated to adjust the angle of incidence of the wing and combined gear housings and shaft bearings pivotally mounted upon the airplane.

In testimony whereof I affix my signature.

PAUL E. GILLESPIE.